(12) United States Patent
Kumar et al.

(10) Patent No.: US 12,719,811 B2
(45) Date of Patent: Aug. 25, 2026

(54) DYNAMIC QUEUE RE-PRIORITIZATION

(71) Applicant: Dell Products L.P., Round Rock, TX (US)

(72) Inventors: Avinash Kumar, Patna (IN); Yevgeni Gehtman, Modi'in (IL); Ophir Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/912,483

(22) Filed: Oct. 10, 2024

(65) Prior Publication Data

US 2026/0106842 A1 Apr. 16, 2026

(51) Int. Cl.

*H04L 47/6275* (2022.01)
*H04L 47/20* (2022.01)
*H04L 47/62* (2022.01)

(52) U.S. Cl.

CPC .......... *H04L 47/6275* (2013.01); *H04L 47/20* (2013.01); *H04L 47/624* (2013.01)

(58) Field of Classification Search

CPC . H04N 21/2326; H04L 47/2433; H04L 47/50; H04L 47/623

See application file for complete search history.

(56) References Cited

U.S. PATENT DOCUMENTS 6,546,017 B1 * 4/2003 Khaunte ............. H04L 47/2433 370/468
11,540,164 B2 * 12/2022 Kwok .................. H04W 80/08
2008/0034024 A1 * 2/2008 Savell ............... H03H 17/0009 708/313
2015/0100372 A1 * 4/2015 Stanar .................. G06F 9/5038 705/7.29
2018/0183724 A1 * 6/2018 Callard .............. H04L 47/6295

* cited by examiner

*Primary Examiner* — Chirag R Patel
(74) *Attorney, Agent, or Firm* — Amin, Turocy & Watson, LLP

(57) ABSTRACT

A system can maintain a group of priority queues for messages, wherein respective existing messages are assigned to respective priority queues of the group of priority queues based on a first policy. The system can change from the first policy to a second policy with respect to the group of priority queues, wherein the changing is performed independently of disrupting delivery of the existing messages. The system can assign respective new messages to the respective priority queues based on the second policy. The system can, based on changing to the second policy, re-order the respective existing messages of the respective priority queues from respective rears of the respective priority queues to respective fronts of the respective priority queues. The system can deliver at least some of the respective existing messages and at least some of the respective new messages from the respective priority queues.

20 Claims, 11 Drawing Sheets

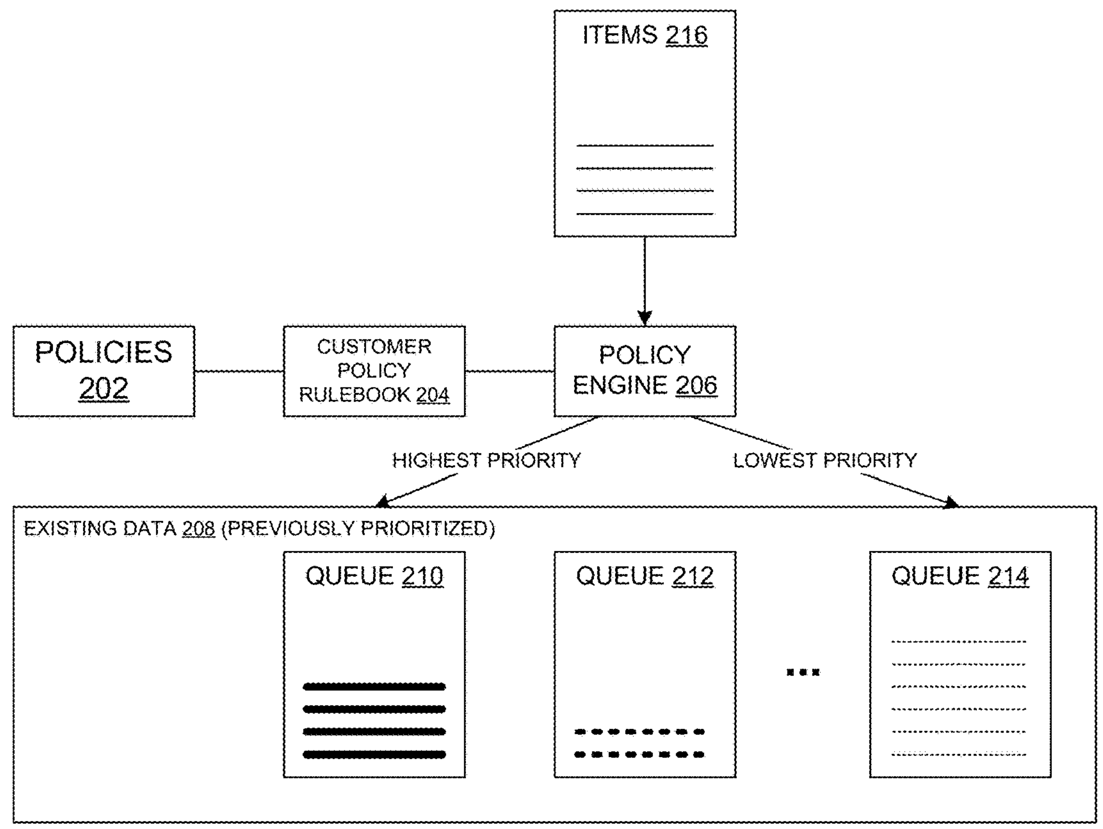
FIG. 2

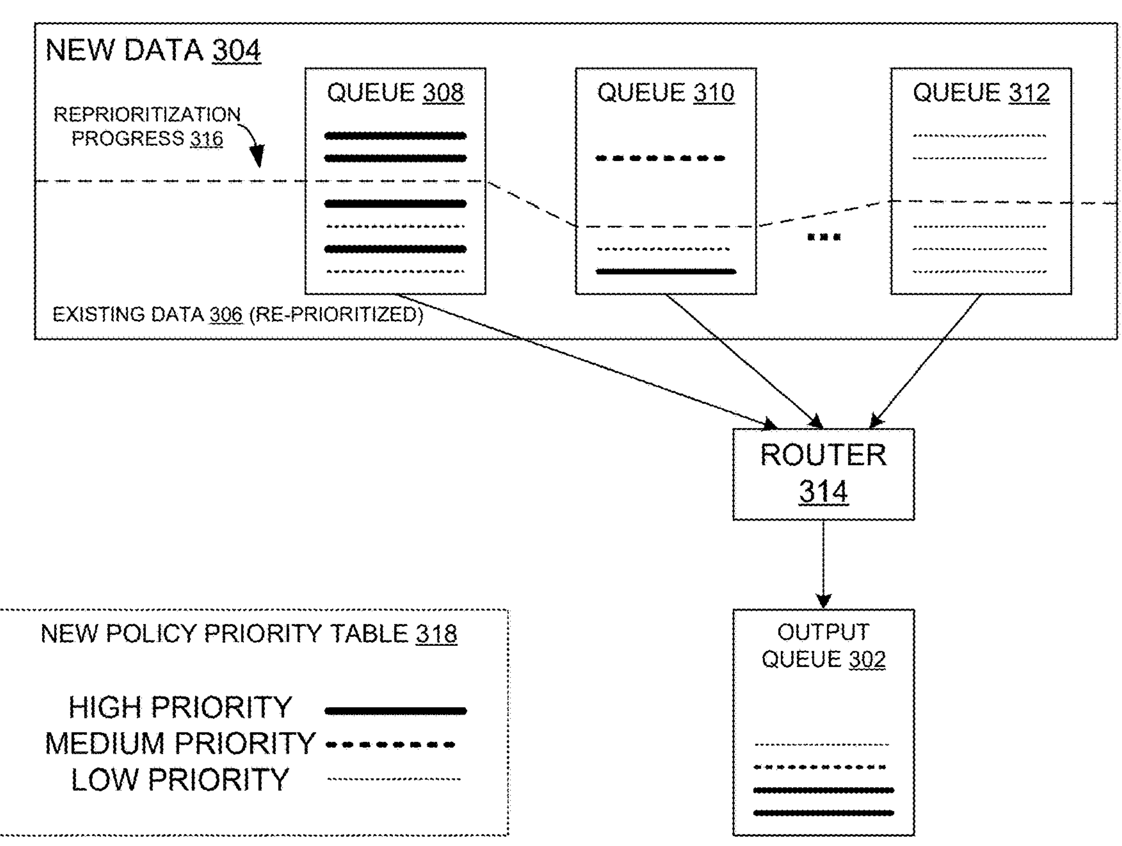
FIG. 3

600

DYNAMIC QUEUE RE-PRIORITIZATION COMPONENT 608

QUEUES 602

| **Low** | 8:00 | 8:01 | 8:02 | 8:03 | 8:04 | 8:05 | 8:06 | 8:07 | 8:08 |
|---|---|---|---|---|---|---|---|---|---|
| **Medium** | 8:09 | 8:10 | 8:12 | 8:14 | 8:17 | 8:18 | 8:23 | 8:24 | 8:25 |
| **High** | 8:10 | 8:11 | 8:13 | 8:15 | 8:16 | 8:19 | 8:20 | 8:21 | 8:22 |

FIG. 6

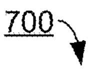
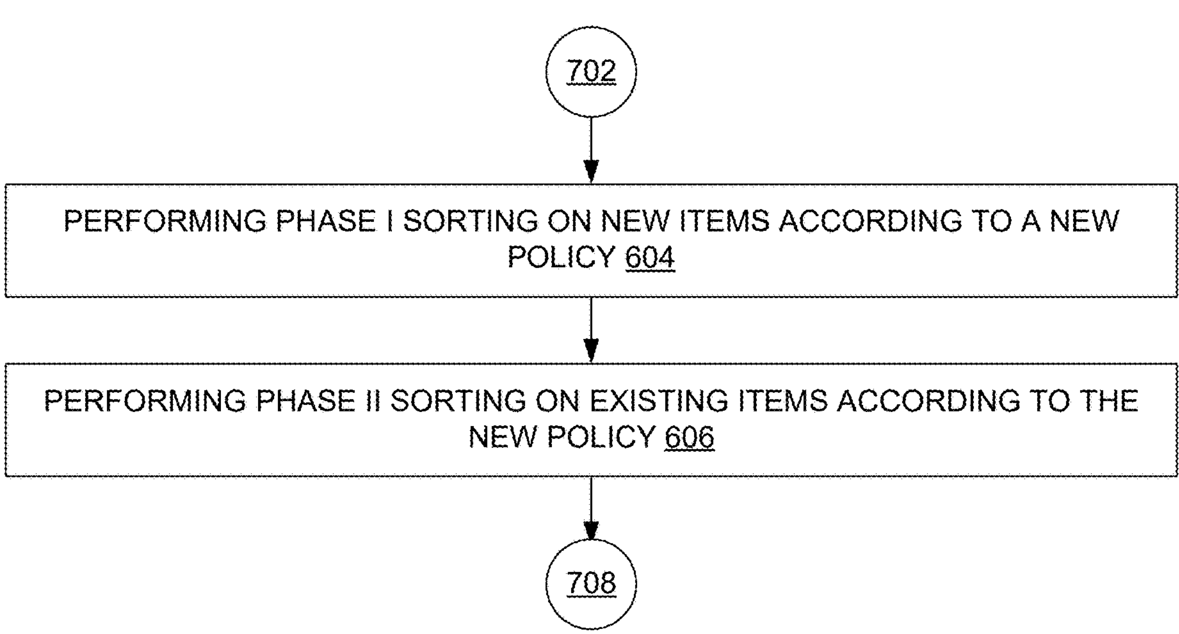
FIG. 7

800

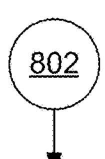

MAINTAINING A GROUP OF PRIORITY QUEUES FOR MESSAGES, WHEREIN RESPECTIVE EXISTING MESSAGES ARE ASSIGNED TO RESPECTIVE PRIORITY QUEUES OF THE GROUP OF PRIORITY QUEUES BASED ON A FIRST POLICY 704

CHANGING FROM THE FIRST POLICY TO A SECOND POLICY WITH RESPECT TO THE GROUP OF PRIORITY QUEUES, WHEREIN THE CHANGING IS PERFORMED INDEPENDENTLY OF DISRUPTING DELIVERY OF THE EXISTING MESSAGES 706

BASED ON CHANGING TO THE SECOND POLICY, ASSIGNING RESPECTIVE NEW MESSAGES TO THE RESPECTIVE PRIORITY QUEUES BASED ON THE SECOND POLICY 708

BASED ON CHANGING TO THE SECOND POLICY, RE-ORDERING THE RESPECTIVE EXISTING MESSAGES OF THE RESPECTIVE PRIORITY QUEUES FROM RESPECTIVE REARS OF THE RESPECTIVE PRIORITY QUEUES TO RESPECTIVE FRONTS OF THE RESPECTIVE PRIORITY QUEUES 710

DELIVERING AT LEAST SOME OF THE RESPECTIVE EXISTING MESSAGES AND AT LEAST SOME OF THE RESPECTIVE NEW MESSAGES FROM THE RESPECTIVE PRIORITY QUEUES 712

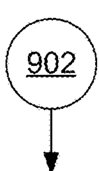

SWITCHING FROM A FIRST POLICY TO A SECOND POLICY WITH RESPECT TO A GROUP OF PRIORITY QUEUES FOR MESSAGES, WHEREIN RESPECTIVE EXISTING MESSAGES IN THE RESPECTIVE PRIORITY QUEUES ARE ASSIGNED TO RESPECTIVE PRIORITY QUEUES OF THE GROUP OF PRIORITY QUEUES BASED ON THE FIRST POLICY 804

BASED ON SWITCHING TO THE SECOND POLICY, ASSIGNING RESPECTIVE NEW MESSAGES TO THE RESPECTIVE PRIORITY QUEUES BASED ON THE SECOND POLICY, AND RE-ORDERING THE RESPECTIVE EXISTING MESSAGES OF THE RESPECTIVE PRIORITY QUEUES FROM RESPECTIVE REARS OF THE RESPECTIVE PRIORITY QUEUES TO RESPECTIVE FRONTS OF THE RESPECTIVE PRIORITY QUEUES 806

DELIVERING AT LEAST SOME OF THE RESPECTIVE EXISTING MESSAGES AND AT LEAST SOME OF THE RESPECTIVE NEW MESSAGES FROM THE RESPECTIVE PRIORITY QUEUES 808

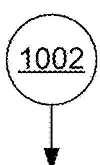

BASED ON SWITCHING FROM A FIRST POLICY TO A SECOND POLICY WITH RESPECT TO A GROUP OF PRIORITY QUEUES FOR MESSAGES, WHEREIN RESPECTIVE EXISTING MESSAGES IN THE RESPECTIVE PRIORITY QUEUES ARE ASSIGNED TO RESPECTIVE PRIORITY QUEUES OF THE GROUP OF PRIORITY QUEUES BASED ON A FIRST POLICY, ASSIGNING RESPECTIVE NEW MESSAGES TO THE RESPECTIVE PRIORITY QUEUES BASED ON THE SECOND POLICY, AND RE-ORDERING THE RESPECTIVE EXISTING MESSAGES OF THE RESPECTIVE PRIORITY QUEUES FROM RESPECTIVE TAILS OF THE RESPECTIVE PRIORITY QUEUES TO RESPECTIVE HEADS OF THE RESPECTIVE PRIORITY QUEUES 904

DELIVERING AT LEAST SOME OF THE RESPECTIVE EXISTING MESSAGES AND AT LEAST SOME OF THE RESPECTIVE NEW MESSAGES FROM THE RESPECTIVE PRIORITY QUEUES 906

DYNAMIC QUEUE RE-PRIORITIZATION

BACKGROUND

Items (e.g., computer data packets) can have their transmission prioritized by sorting the items into particular priority queues of a group of priority queues.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a group of priority queues for messages, wherein respective existing messages are assigned to respective priority queues of the group of priority queues based on a first policy. The system can change from the first policy to a second policy with respect to the group of priority queues, wherein the changing is performed independently of disrupting delivery of the existing messages. The system can, based on changing to the second policy, assign respective new messages to the respective priority queues based on the second policy. The system can, based on changing to the second policy, re-order the respective existing messages of the respective priority queues from respective rears of the respective priority queues to respective fronts of the respective priority queues. The system can deliver at least some of the respective existing messages and at least some of the respective new messages from the respective priority queues.

An example method can comprise switching, by a system comprising at least one processor, from a first policy to a second policy with respect to a group of priority queues for messages, wherein respective existing messages in the respective priority queues are assigned to respective priority queues of the group of priority queues based on the first policy. The method can further comprise, based on switching to the second policy, assigning, by the system, respective new messages to the respective priority queues based on the second policy, and re-ordering, by the system, the respective existing messages of the respective priority queues from respective rears of the respective priority queues to respective fronts of the respective priority queues. The method can further comprise delivering, by the system, at least some of the respective existing messages and at least some of the respective new messages from the respective priority queues.

An example non-transitory computer-readable medium can comprise instructions that, in response to execution, cause a system comprising a processor to perform operations. These operations can comprise, based on switching from a first policy to a second policy with respect to a group of priority queues for messages, wherein respective existing messages in the respective priority queues are assigned to respective priority queues of the group of priority queues based on a first policy, assigning respective new messages to the respective priority queues based on the second policy, and re-ordering the respective existing messages of the respective priority queues from respective tails of the respective priority queues to respective heads of the respective priority queues. These operations can further comprise delivering at least some of the respective existing messages and at least some of the respective new messages from the respective priority queues.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example of a phase I, and that can facilitate dynamic queue re-prioritization, in accordance with an embodiment of this disclosure;

FIG. 3 illustrates an example of a phase II, and that can facilitate dynamic queue re-prioritization, in accordance with an embodiment of this disclosure;

FIG. 6 illustrates an example of timestamped items in queues, and that can facilitate dynamic queue re-prioritization, in accordance with an embodiment of this disclosure;

FIG. 7 illustrates an example process flow that can facilitate dynamic queue re-prioritization, in accordance with an embodiment of this disclosure;

FIG. 8 illustrates another example process flow that can facilitate dynamic queue re-prioritization, in accordance with an embodiment of this disclosure;

FIG. 9 illustrates another example process flow that can facilitate dynamic queue re-prioritization, in accordance with an embodiment of this disclosure;

FIG. 10 illustrates another example process flow that can facilitate dynamic queue re-prioritization, in accordance with an embodiment of this disclosure.

DETAILED DESCRIPTION

Overview

Figure 1:
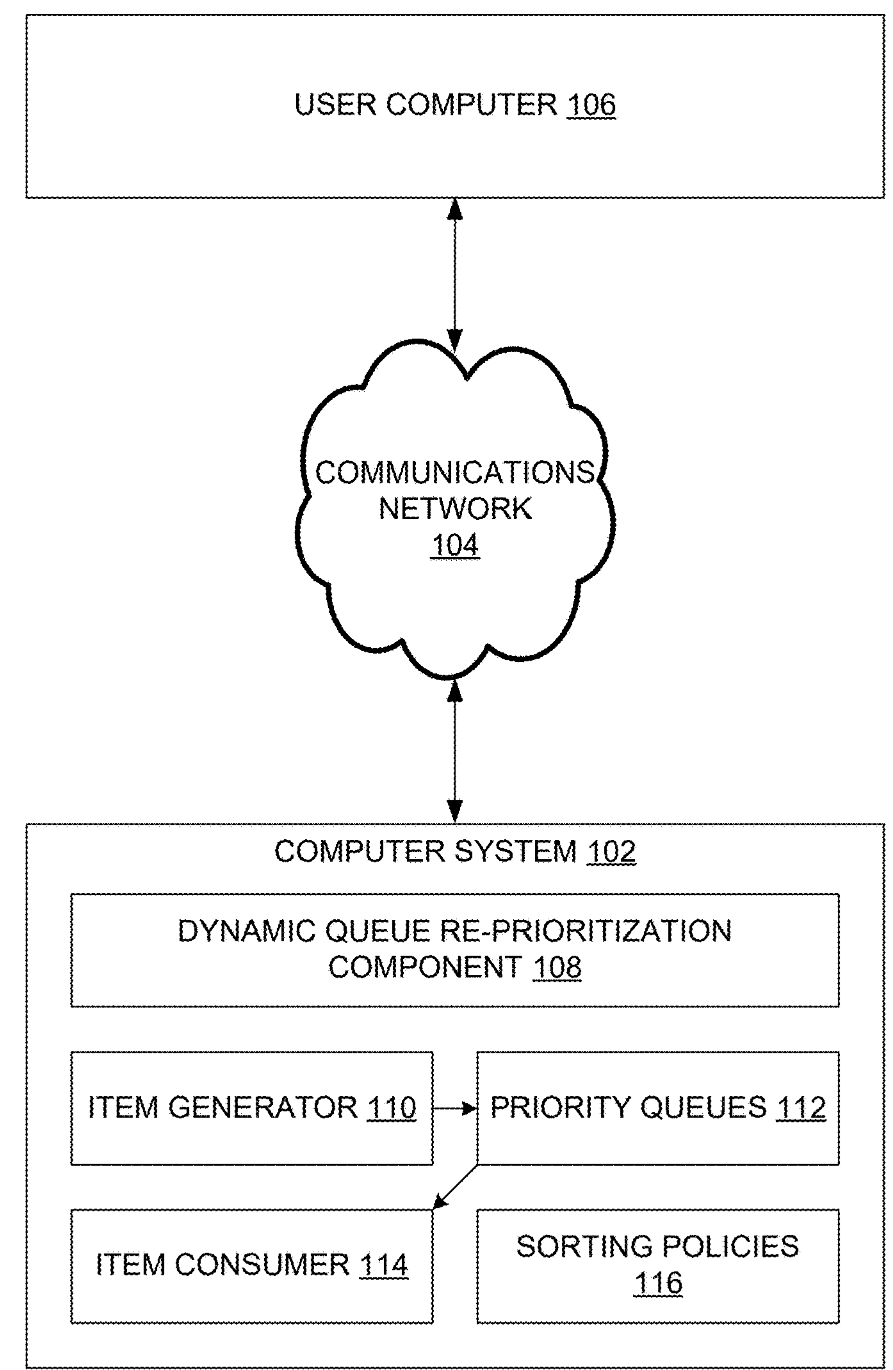
FIG. 1 illustrates an example system architecture that can facilitate dynamic queue re-prioritization, in accordance with an embodiment of this disclosure.

Task queuing or a delay in processing issues can result due to message congestion. Success can depend on how efficiently and in a timely manner the task is processed. This can become more important where task prioritization is requested or required (e.g., it can be customer-specific) and the message queue is expected to meet the prioritized order.

An example of prioritization according to the present techniques can comprise prioritizing video teleconferencing data traffic over other data traffic.

Prior approaches generally require removing all items from a priority queue, and re-adding them using a new prioritization mechanism. This process can involve stopping message handling, reprioritizing, and resuming message handling. So, under prior approaches, there can be a direct availability impact, which can also impact performance.

For instance, if the previous priority was based on the "sending application" and now it is based on the "user," it can be that all messages must be extracted and re-queued with the new priority. This approach can implicate pausing message handling to perform the reprioritization, which can be problematic for real-time systems as it can involve halting the processing of requests, leading to significant issues in maintaining real-time performance.

Producers: In this scenario, the user interface (UI) component that the user interacts with to initiate the request (e.g., a backup/restore request) can act as the producer. For example, when the user clicks a button or takes an action in the UI to trigger the backup, it can generate a message or event indicating that a backup is requested.

Consumers: The backup server itself can act as a consumer, or a component within it that is responsible for handling backup requests can act as the consumer. It can listen for incoming requests/messages generated by the UI (the producer). When it receives a backup request message, it can initiate the backup process, possibly interacting with storage devices or other systems to perform the backup operation.

In the present examples, customers can be the UI users who produce the message request (e.g., backup/restore requests) to be consumed by servers (e.g., backup servers) hosted on the cloud.

The present techniques can be implemented to facilitate removing an availability impact, alongside addressing a task of prioritizing message queues. The present techniques can involve an iteration-based prioritization mechanism that adapts to fluctuating queue times, effectively managing longer-duration pending queues.

The present techniques can be implemented to perform an orderly processing of items based on their priority levels, moving from low to high priority. This can help to prioritize the higher-priority items promptly by making sure that critical tasks receive immediate attention. There can be a challenge related to transitioning between higher and lower-priority items.

To solve this, the present techniques can incorporate an iteration process that can iterate through the queue in reverse order, ensuring that existing items in a specified position range (for example, from the $1^{st}$ to the $10^{th}$ position) remain untouched. This precautionary measure can be implemented to handle the risk of race conditions and ensure stability.

Adaptive priority transition can be implemented as follows. Moving from High to Low priority according to the present techniques can be conditional upon specific conditions. When the queue experiences a decrease in pending queue times, indicating a reduced workload in the customer environment or a reduction in urgency, the present techniques can dynamically adjust a prioritization mechanism. In some examples, this transition can occur when the queue backlog reduces or when the urgency of high-priority tasks decreases, allowing lower-priority items to be addressed without compromising efficiency.

Strategic backward iteration can be implemented as follows. A backward iteration process can be connected to an entire flow of the prioritization mechanism; it can serve as a technique to handle transitions between higher and lower priority items. As the system iterates through the queue in reverse order, it can help avoid altering the positions of existing items, for example, from the $1^{st}$ to the $10^{th}$ position. By preserving the integrity of these top-priority items, the present techniques can ensure that critical tasks remain undisturbed while facilitating adjustments in priority levels for subsequent items. This backward iteration process can safeguard against potential race conditions or disruptions in the processing flow that can arise from sudden priority changes. Thus, it can help in improving stability and reliability of a queue management system. Timestamps of items in a queue can be used to identify the order of items within a queue.

Some examples of the present techniques can generally be implemented with two phases, as follows. Phase I involves previous data, whereas Phase II involves the new data. When data is re-prioritized, the re-prioritized items can be entered into the correct queue, and the item's location can depend on the timestamp.

In Phase II, preexisting data can be observed and reprioritized. This can be implemented where the techniques involve not only re-prioritizing, but also maintaining the synchronization of messages. Hence, this can ensure that messages sent previously to other messages are kept in their order.

The present techniques can be implemented to facilitate a removal of an availability impact for queues during dynamic re-prioritization.

Various implementations of priority queues can be made. There can be 2–n queues (one per priority). A priority-setting algorithm can be utilized that determines where an object is inserted in a queue. Queues can be drained by their order (e.g., drain queue #1, #2, etc.).

In prior approaches, re-prioritization can be performed by draining all objects to a different priority queue according to a different priority-setting algorithm than was used to originally assign objects to queues. This can involve pausing request handling during the re-prioritization process.

The present techniques can be implemented to re-prioritize a queue without disrupting a service that uses it. This can be done, for example, where queue re-prioritization does not have to be performed immediately. According to the present techniques, re-prioritization can be performed from tail to head on each internal queue (while tracking a timestamp of each request to remain consistent), while the queue remains active.

The present techniques can generally be based on a scenario where reprioritization is important, but is not critical to immediately implement. This can provide a time buffer with which to effectuate reprioritization according to a new policy. The present techniques can comprise sorting new messages according to a new policy, as well as (e.g., because processing existing queues could take a long time), reprocessing existing queues from a queue tail to a queue head.

Example Architectures, Etc.

FIG. 1 illustrates an example system architecture 100 that can facilitate dynamic queue re-prioritization, in accordance with an embodiment of this disclosure.

System architecture 100 comprises computer system 102, communications network 104, and user computer 106. In turn, computer system 102 comprises dynamic queue re-prioritization component 108, item generator 110, priority queues 112, item consumer 114, and sorting policies 116.

Figure 11:
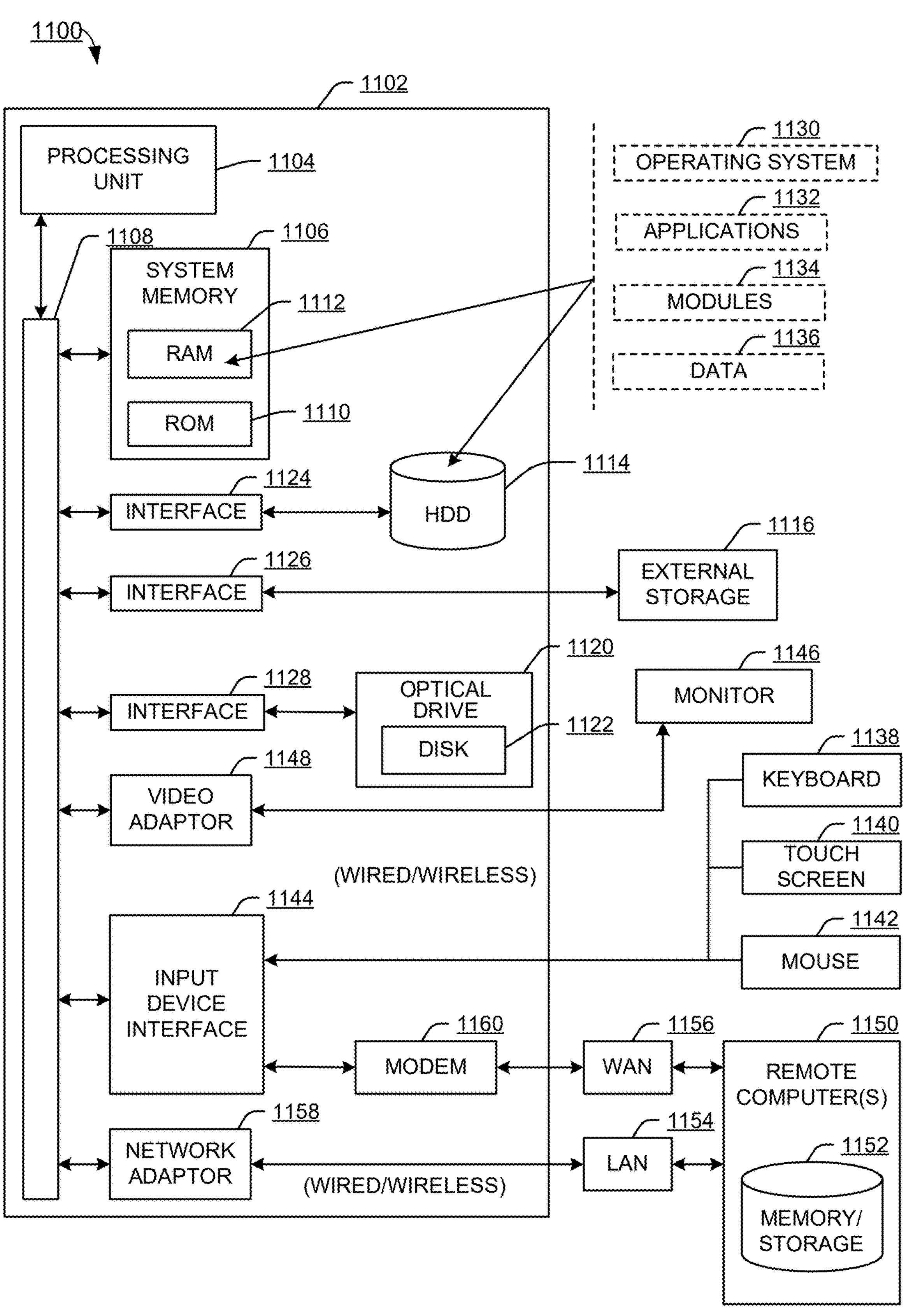
FIG. 11 illustrates an example block diagram of a computer operable to execute an embodiment of this disclosure.

Each of computer system 102 and/or user computer 106 can be implemented with part(s) of computing environment 1100 of FIG. 11. Communications network 104 can comprise a computer communications network, such as the Internet, or an isolated private computer communications network.

Items can be created by item generator 110. For instance, these items can relate to data packets transmitted between computer system 102 and user computer 106 via communications network 104. Or these items can be help tickets generated based on data received from user computer 106.

As these items are generated by item generator 110, item generator 110 can insert these items into respective priority queues of priority queues 112. Items can be output from priority queues 112 and sent to item consumer 114 (e.g., an application).

Items can be sorted in priority queues 112 based on a sorting policy of sorting policies 116. When that sorting policy changes, dynamic queue re-prioritization component 108 can cause new items to be inserted into priority queues 112 according to the new sorting policy, as well as pre-existing items in priority queues 112 to be re-sorted according to the new sorting policy. Dynamic queue re-prioritization component 108 can effectuate this change in sorting policies without disrupting the flow of items.

In some examples, dynamic queue re-prioritization component 108 can implement part(s) of the process flows of FIGS. 7-10 to facilitate dynamic queue re-prioritization.

It can be appreciated that system architecture 100 is one example system architecture for dynamic queue re-prioritization, and that there can be other system architectures that facilitate dynamic queue re-prioritization.

FIG. 2 illustrates an example 200 of a phase I, and that can facilitate dynamic queue re-prioritization, in accordance with an embodiment of this disclosure. In some examples, part(s) of example 200 can be implemented by part(s) of system architecture 100 of FIG. 1 to facilitate dynamic queue re-prioritization.

Example 200 comprises policies 202, customer policy rulebook 204, policy engine 206, existing data 208 (previously prioritized), queue 210, queue 212, queue 214, and items 216.

In phase I of the present techniques, a prioritization policy has changed (as expressed in customer policy rulebook 204), and newly incoming items can be placed in the appropriate queue (queue 210, queue 212, or queue 214) according to this policy. These queues can currently contain items that were organized according to a previous policy. In that way, during phase I, a queue can comprise a mixture of newer items that should be in that queue according to the current policy, and older items that might not belong in that queue according to the current policy.

FIG. 3 illustrates an example 300 of a phase II, and that can facilitate dynamic queue re-prioritization, in accordance with an embodiment of this disclosure. In some examples, part(s) of example 300 can be implemented by part(s) of system architecture 100 of FIG. 1 to facilitate dynamic queue re-prioritization.

Example 300 comprises output queue 302, new data 304, existing data 306 (re-prioritized), queue 308, queue 310, queue 312, router 314, reprioritization progress 316 (which indicates that prioritization is by timestamp, so is not a straight line across the queues), and new policy priority table 318 (which indicates a priority of queue elements under the new/current policy).

In phase II of the present techniques (which can be viewed in conjunction with phase I as depicted in FIG. 2), at least some items placed in queues before the policy change described with respect to FIG. 2 can be reordered. This reordering can take place from a tail of a queue toward a head of the queue and can omit a defined number of items that are at the head of the queue.

Figure 4:
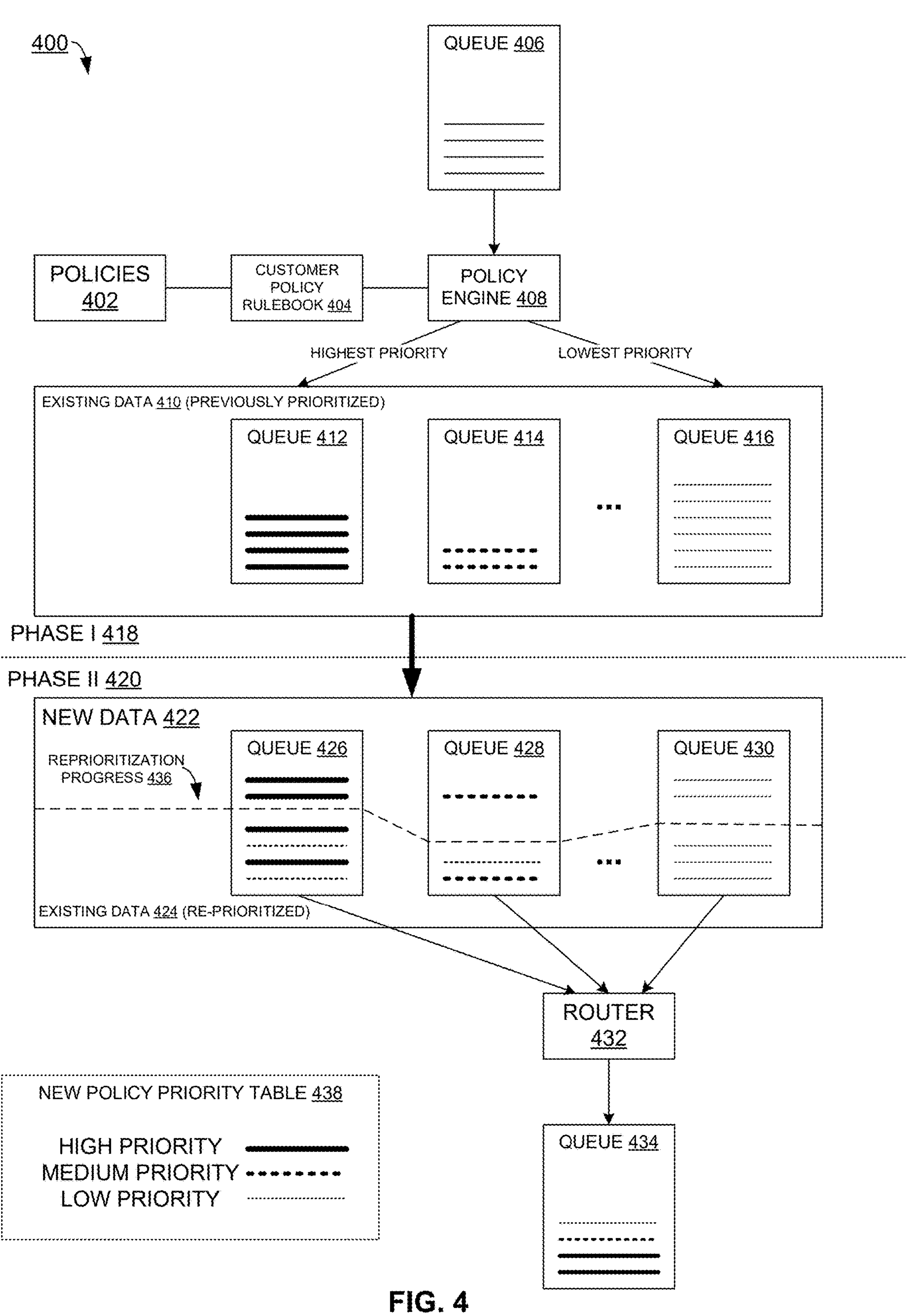
FIG. 4 illustrates an example of an overall approach and that can facilitate dynamic queue re-prioritization, in accordance with an embodiment of this disclosure.

FIG. 4 illustrates an example 400 of an overall approach and that can facilitate dynamic queue re-prioritization, in accordance with an embodiment of this disclosure. In some examples, part(s) of example 400 can be implemented by part(s) of system architecture 100 of FIG. 1 to facilitate dynamic queue re-prioritization.

Example 400 comprises policies 402, customer policy rulebook 404, queue 406, policy engine 408, existing data 410 (previously prioritized), queue 412, queue 414, queue 416, phase I 418, phase II 420, new data 422, existing data 424 (re-prioritized), queue 426, queue 428, queue 430, router 432, queue 434, reprioritization progress 436, and new policy priority table 438.

Example 400 can generally comprise a combination of phase I (as depicted in FIG. 2) and phase II (as depicted in FIG. 3), where, upon a policy change, new items can be sorted according to the new policy (phase I), and at least some existing items can be resorted according to the new policy (phase II).

Figure 5:
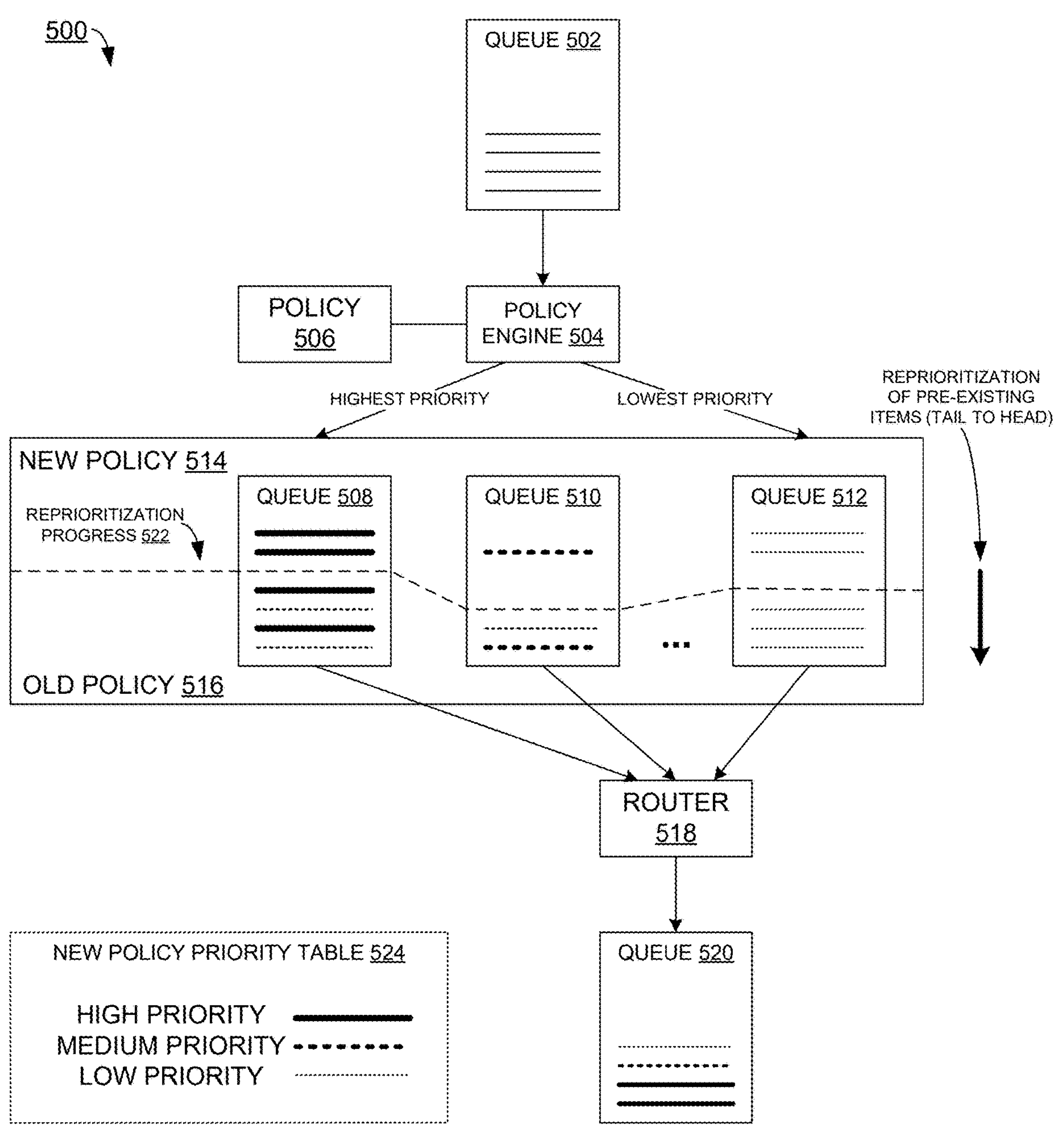
FIG. 5 illustrates another example that can facilitate dynamic queue re-prioritization, in accordance with an embodiment of this disclosure.

FIG. 5 illustrates another example 500 that can facilitate dynamic queue re-prioritization, in accordance with an embodiment of this disclosure. In some examples, part(s) of example 500 can be implemented by part(s) of system architecture 100 of FIG. 1 to facilitate dynamic queue re-prioritization.

Example 500 comprises queue 502, policy engine 504, policy 506, queue 508, queue 510, queue 512, new policy 514, old policy 516, router 518, queue 520, reprioritization progress 522, and new policy priority table 524.

Example 500 illustrates an example where, after a policy change, a queue can contain items sorted into that queue according to the new policy (new policy 514, where these items have been sorted into that queue after the policy was changed), and also items sorted into that queue according to an old policy (old policy 516, where these items were sorted into that queue according to the old policy).

According to the present techniques, at least some of the items that were sorted into that queue according to the old policy can then be resorted according to the new policy (e.g., by working from the tail of the queue to the head of the queue).

FIG. 6 illustrates an example 600 of timestamped items in queues, and that can facilitate dynamic queue re-prioritization, in accordance with an embodiment of this disclosure. In some examples, part(s) of example 600 can be implemented by part(s) of system architecture 100 of FIG. 1 to facilitate dynamic queue re-prioritization.

Example 600 comprises queues 602 and dynamic queue re-prioritization component 608 (which can be similar to dynamic queue re-prioritization component 108 of FIG. 1).

Queues 602 comprises three queues (with High, Medium, and Low priorities, respectively), where each queue contains timestamped items (e.g., the Low queue has items with timestamps of 8:01, 8:02, 8:03, 8:04, 8:05, 8:06, 8:07, and 8:08).

In example 600, items are not distributed evenly over time. To requeue nine items, it would be incorrect to take the last three items of each queue (e.g., the items from the Low queue with timestamps of 8:06, 8:07, and 8:08). Rather, a correct approach according to the present techniques would be to take the latest items entered into queues 602. In example 600, these are the nine items with timestamps of 8:17, 8:18, 8:19, 8:20, 8:21, 8:22, 8:23, 8:24, and 8:25. So, it can be that reordering queues according to a new policy does not involve reordering the same number of items per queue, but a varying number of items per queue (e.g., those items with the most recent time stamps, regardless of the queue they are in).

Example Process Flows

FIG. 7 illustrates an example process flow that can facilitate dynamic queue re-prioritization, in accordance with an embodiment of this disclosure. In some examples, one or more embodiments of process flow 700 can be implemented by system architecture 100 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 800 of FIG. 8, process flow 900 of FIG. 9, and/or process flow 1000 of FIG. 10.

Process flow 700 begins with 702, and moves to operation 704.

Operation 704 depicts performing phase I sorting on new items according to a new policy. This can be phase I as depicted with respect to FIG. 2.

After operation 704, process flow 700 moves to operation 706.

Operation 706 depicts performing phase II sorting on existing items according to the new policy. This can be phase II as depicted with respect to FIG. 3. In some examples, phase I and phase II can overlap, and be performed at least partially concurrently. For example, while new items are being inserted into queues according to the new policy (phase I), old items can be resorted according to the new policy (phase II).

After operation 706, process flow 700 moves to 708, where process flow 700 ends.

FIG. 8 illustrates an example process flow that can facilitate dynamic queue re-prioritization, in accordance with an embodiment of this disclosure. In some examples, one or more embodiments of process flow 800 can be implemented by system architecture 100 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 700 of FIG. 7, process flow 900 of FIG. 9, and/or process flow 1000 of FIG. 10.

Process flow 800 begins with 802, and moves to operation 804.

Operation 804 depicts maintaining a group of priority queues for messages, wherein respective existing messages are assigned to respective priority queues of the group of priority queues based on a first policy. These priority queues can be similar to priority queues 112 of FIG. 1, while the first policy can be a policy of sorting policies 116.

In some examples, the first policy is based on respective applications that originated the respective existing messages. In some examples, the first policy is based on respective user accounts that are associated with originating the respective existing messages. That is, there can be various sorting policies, such as one that prioritizes messages based on the application that originated a message, and/or one that prioritizes messages based on a user account associated with the message.

After operation 804, process flow 800 moves to operation 806.

Operation 806 depicts changing from the first policy to a second policy with respect to the group of priority queues, wherein the changing is performed independently of disrupting delivery of the existing messages. The second policy can be another policy of sorting policies 116 of FIG. 1.

After operation 806, process flow 800 moves to operation 808.

Operation 808 depicts, based on changing to the second policy, assigning respective new messages to the respective priority queues based on the second policy. This can be performed in a similar manner as phase I as described herein.

After operation 808, process flow 800 moves to operation 810.

Operation 810 depicts, based on changing to the second policy, re-ordering the respective existing messages of the respective priority queues from respective rears of the respective priority queues to respective fronts of the respective priority queues. This can be performed in a similar manner as phase II as described herein.

In some examples, the re-ordering of the respective existing messages of the respective priority queues from the respective rears of the respective priority queues to the respective fronts of the respective priority queues comprises refraining from reordering respective subportions of the respective priority queues at the respective fronts of the respective priority queues. In some examples, the respective subportions comprise respective defined numbers of messages. That is, there can be untouched items at the head of queues that are not resorted.

After operation 810, process flow 800 moves to operation 812.

Operation 812 depicts delivering at least some of the respective existing messages and at least some of the respective new messages from the respective priority queues. Using the example of FIG. 1, this can comprise messages from priority queues 112 being delivered to item consumer 114.

In some examples, the delivering of the at least some of the respective existing messages is performed concurrently with the changing from the first policy to the second policy. In some examples, the delivering of the at least some of the respective existing messages is performed concurrently with the assigning of the respective new messages to the respective priority queues based on the second policy. In some examples, the delivering of the at least some of the respective existing messages is performed concurrently with the re-ordering of the respective existing messages of the respective priority queues. That is, according to the present techniques, changing a policy for priority queues can be nondisruptive.

After operation 812, process flow 800 moves to 814, where process flow 800 ends.

FIG. 9 illustrates an example process flow that can facilitate dynamic queue re-prioritization, in accordance with an embodiment of this disclosure. In some examples, one or more embodiments of process flow 900 can be implemented by system architecture 100 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 700 of FIG. 7, process flow 800 of FIG. 8, and/or process flow 1000 of FIG. 10.

Process flow 900 begins with 902, and moves to operation 904.

Operation 904 depicts switching from a first policy to a second policy with respect to a group of priority queues for messages, wherein respective existing messages in the respective priority queues are assigned to respective priority queues of the group of priority queues based on the first policy. In some examples, operation 904 can be implemented in a similar manner as operations 804-806 of FIG. 8.

In some examples, the switching from the first policy to the second policy is based on determining that a queue backlog metric associated with the group of priority queues satisfies a queue backlog criterion. In some examples, the switching from the first policy to the second policy is based on determining that a queue urgency metric associated with the group of priority queues satisfies a queue urgency criterion. That is, in some examples, from High to Low priority according to the present techniques can be conditional upon specific conditions. When the queue experiences a decrease in pending queue times, indicating a reduced workload in the customer environment or a reduction in urgency, the present techniques can dynamically adjust a prioritization mechanism. In some examples, this transition can occur when the queue backlog reduces or when the urgency of high-priority tasks decreases, allowing lower-priority items to be addressed without compromising efficiency.

In some examples, the respective existing messages are associated with respective timestamps, and the respective existing messages are sorted in the respective priority queues based on the respective timestamps. That is, an item can be inserted into a particular location within priority queue based on its timestamp (e.g., within a priority queue, items are sorted by timestamp such that older items are delivered before newer items).

After operation 904, process flow 900 moves to operation 906.

Operation 906 depicts, based on switching to the second policy, assigning respective new messages to the respective priority queues based on the second policy, and re-ordering the respective existing messages of the respective priority queues from respective rears of the respective priority queues to respective fronts of the respective priority queues. In some examples, operation 906 can be implemented in a similar manner as operations 808-810 of FIG. 8.

In some examples, the re-ordering of the respective existing messages of the respective priority queues from the respective rears of the respective priority queues to the respective fronts of the respective priority queues satisfies a race condition mitigation criterion. That is, a backward iteration process according to the present techniques can safeguard against potential race conditions or disruptions in the processing flow that can arise from sudden priority changes. Thus, it can help in improving stability and reliability of a queue management system.

In some examples, the re-ordering of the respective existing messages of the respective priority queues from the respective rears of the respective priority queues to the respective fronts of the respective priority queues omits reordering respective portions of the respective priority queues at the respective fronts of the respective priority queues.

After operation 906, process flow 900 moves to operation 908.

Operation 908 depicts delivering at least some of the respective existing messages and at least some of the respective new messages from the respective priority queues. In some examples, operation 908 can be implemented in a similar manner as operation 812 of FIG. 8.

After operation 908, process flow 900 moves to 910, where process flow 900 ends.

FIG. 10 illustrates an example process flow that can facilitate dynamic queue re-prioritization, in accordance with an embodiment of this disclosure. In some examples, one or more embodiments of process flow 1000 can be implemented by system architecture 100 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 700 of FIG. 7, process flow 800 of FIG. 8, and/or process flow 900 of FIG. 9.

Process flow 1000 begins with 1002, and moves to operation 1004.

Operation 1004 depicts, based on switching from a first policy to a second policy with respect to a group of priority queues for messages, wherein respective existing messages in the respective priority queues are assigned to respective priority queues of the group of priority queues based on a first policy, assigning respective new messages to the respective priority queues based on the second policy, and re-ordering the respective existing messages of the respective priority queues from respective tails of the respective priority queues to respective heads of the respective priority queues. In some examples, operation 1004 can be implemented in a similar manner as operations 804-810 of FIG. 8.

In some examples, the re-ordering of the respective existing messages of the respective priority queues from the respective tails of the respective priority queues to the respective heads of the respective priority queues is performed independently of reordering respective portions of the respective priority queues at the respective heads of the respective priority queues. That is, there can be untouched items at the head of queues that are not resorted.

In some examples, the first policy is based on respective applications that originated the respective existing messages, or based on respective user accounts that are associated with originating the respective existing messages.

After operation 1004, process flow 1000 moves to operation 1006.

Operation 1006 depicts delivering at least some of the respective existing messages and at least some of the respective new messages from the respective priority queues. In some examples, operation 1006 can be implemented in a similar manner as operation 812 of FIG. 8.

In some examples, the delivering of the at least some of the respective existing messages is performed concomitantly with the changing from the first policy to the second policy. In some examples, the delivering of the at least some of the respective existing messages is performed concomitantly with the assigning of the respective new messages to the respective priority queues based on the second policy. In some examples, the delivering of the at least some of the respective existing messages is performed concomitantly with the re-ordering of the respective existing messages of the respective priority queues. That is, according to the present techniques, changing a policy for priority queues can be nondisruptive.

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer system 102 and/or user computer 106 of FIG. 1.

In some examples, computing environment 1100 can implement one or more embodiments of the process flows of FIGS. 7-10 to facilitate dynamic queue re-prioritization.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types.

Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1116 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

maintaining a group of priority queues for messages, wherein respective existing messages are assigned to respective priority queues of the group of priority queues based on a first policy;

changing from the first policy to a second policy with respect to the group of priority queues, wherein the changing is performed independently of disrupting delivery of the existing messages;

based on changing to the second policy, assigning respective new messages to the respective priority queues based on the second policy;

based on changing to the second policy, re-ordering the respective existing messages of the respective priority queues from respective rears of the respective priority queues to respective fronts of the respective priority queues; and delivering at least some of the respective existing messages and at least some of the respective new messages from the respective priority queues.

2. The system of claim 1, wherein the re-ordering of the respective existing messages of the respective priority queues from the respective rears of the respective priority queues to the respective fronts of the respective priority queues comprises:

refraining from reordering respective subportions of the respective priority queues at the respective fronts of the respective priority queues.

3. The system of claim 2, wherein the respective subportions comprise respective defined numbers of messages.

4. The system of claim 1, wherein the delivering of the at least some of the respective existing messages is performed concurrently with the changing from the first policy to the second policy.

5. The system of claim 1, wherein the delivering of the at least some of the respective existing messages is performed concurrently with the assigning of the respective new messages to the respective priority queues based on the second policy.

6. The system of claim 1, wherein the delivering of the at least some of the respective existing messages is performed concurrently with the re-ordering of the respective existing messages of the respective priority queues.

7. The system of claim 1, wherein the first policy is based on respective applications that originated the respective existing messages.

8. The system of claim 1, wherein the first policy is based on respective user accounts that are associated with originating the respective existing messages.

9. A method, comprising:

switching, by a system comprising at least one processor, from a first policy to a second policy with respect to a group of priority queues for messages, wherein respective existing messages in the respective priority queues are assigned to respective priority queues of the group of priority queues based on the first policy;

based on switching to the second policy, assigning, by the system, respective new messages to the respective priority queues based on the second policy, and re-ordering, by the system, the respective existing messages of the respective priority queues from respective rears of the respective priority queues to respective fronts of the respective priority queues; and delivering, by the system, at least some of the respective existing messages and at least some of the respective new messages from the respective priority queues.

10. The method of claim 9, wherein the switching from the first policy to the second policy is based on determining that a queue backlog metric associated with the group of priority queues satisfies a queue backlog criterion.

11. The method of claim 9, wherein the switching from the first policy to the second policy is based on determining that a queue urgency metric associated with the group of priority queues satisfies a queue urgency criterion.

12. The method of claim 9, wherein the respective existing messages are associated with respective timestamps, and wherein the respective existing messages are sorted in the respective priority queues based on the respective timestamps.

13. The method of claim 9, wherein the re-ordering of the respective existing messages of the respective priority queues from the respective rears of the respective priority queues to the respective fronts of the respective priority queues satisfies a race condition mitigation criterion.

14. The method of claim 9, wherein the re-ordering of the respective existing messages of the respective priority queues from the respective rears of the respective priority queues to the respective fronts of the respective priority queues omits reordering respective portions of the respective priority queues at the respective fronts of the respective priority queues.

15. A non-transitory computer-readable medium comprising instructions that, in response to execution, cause a system comprising at least one processor to perform operations, comprising:

based on switching from a first policy to a second policy with respect to a group of priority queues for messages, wherein respective existing messages in the respective priority queues are assigned to respective priority queues of the group of priority queues based on a first policy, assigning respective new messages to the respective priority queues based on the second policy, and re-ordering the respective existing messages of the respective priority queues from respective tails of the respective priority queues to respective heads of the respective priority queues; and delivering at least some of the respective existing messages and at least some of the respective new messages from the respective priority queues.

16. The non-transitory computer-readable medium of claim 15, wherein the re-ordering of the respective existing messages of the respective priority queues from the respective tails of the respective priority queues to the respective heads of the respective priority queues is performed independently of reordering respective portions of the respective priority queues at the respective heads of the respective priority queues.

17. The non-transitory computer-readable medium of claim 15, wherein the delivering of the at least some of the respective existing messages is performed concomitantly with the changing from the first policy to the second policy.

18. The non-transitory computer-readable medium of claim 15, wherein the delivering of the at least some of the respective existing messages is performed concomitantly with the assigning of the respective new messages to the respective priority queues based on the second policy.

19. The non-transitory computer-readable medium of claim 15, wherein the delivering of the at least some of the respective existing messages is performed concomitantly with the re-ordering of the respective existing messages of the respective priority queues.

20. The non-transitory computer-readable medium of claim 15, wherein the first policy is based on respective applications that originated the respective existing messages, or based on respective user accounts that are associated with originating the respective existing messages.

* * * * *